(12) United States Patent
Flajnik et al.

(10) Patent No.: US 8,016,309 B2
(45) Date of Patent: Sep. 13, 2011

(54) RUNNING BOARD FOR VEHICLE

(75) Inventors: David Flajnik, LaSalle (CA); Timothy W. Chapman, Etobicoke (CA); Rimas Ciplijauskas, Etobicoke (CA); Changize Sadr, North York (CA)

(73) Assignee: Salflex Polymers Ltd., Weston, Ontario (CA)

( * ) Notice: Subject to any disclaimer, the term of this patent is extended or adjusted under 35 U.S.C. 154(b) by 1004 days.

(21) Appl. No.: 11/812,545

(22) Filed: Jun. 20, 2007

(65) Prior Publication Data
US 2007/0296175 A1  Dec. 27, 2007

Related U.S. Application Data

(60) Provisional application No. 60/815,263, filed on Jun. 21, 2006.

(51) Int. Cl.
*B60R 3/00* (2006.01)
(52) U.S. Cl. .......................... 280/169; 280/163
(58) Field of Classification Search .................. 280/163, 280/164.1, 164.2, 169
See application file for complete search history.

(56) References Cited

U.S. PATENT DOCUMENTS

| | | | | |
|---|---|---|---|---|
| 890,963 A | | 6/1908 | Coffin | |
| 1,679,796 A | * | 8/1928 | Spiro | 280/163 |
| 1,860,654 A | * | 5/1932 | Cavanagh | 280/163 |
| 1,901,869 A | * | 3/1933 | Duffy | 280/163 |
| 3,774,952 A | * | 11/1973 | Zorn | 293/117 |
| 4,721,319 A | * | 1/1988 | Dale | 280/169 |
| 4,943,085 A | * | 7/1990 | Straka | 280/770 |
| 5,193,829 A | | 3/1993 | Holloway et al. | |
| 5,286,049 A | | 2/1994 | Khan | |
| 5,382,035 A | | 1/1995 | Waddington et al. | |
| 5,738,180 A | * | 4/1998 | Hofmann et al. | 180/291 |
| 5,769,439 A | * | 6/1998 | Thompson | 280/163 |
| 5,823,553 A | * | 10/1998 | Thompson | 280/164.1 |
| 5,895,064 A | | 4/1999 | Laubach | |
| 6,050,579 A | * | 4/2000 | Selland et al. | 280/163 |
| 6,173,979 B1 | | 1/2001 | Bernard | |
| 6,203,040 B1 | | 3/2001 | Hutchins | |
| 6,375,207 B1 | | 4/2002 | Dean et al. | |
| 6,412,799 B1 | | 7/2002 | Schrempf | |
| 6,513,821 B1 | | 2/2003 | Heil | |
| 6,533,302 B2 | | 3/2003 | Scruggs et al. | |
| 6,588,782 B2 | | 7/2003 | Coomber et al. | |
| 6,592,135 B2 | | 7/2003 | Hendrix | |
| 6,612,595 B1 | | 9/2003 | Storer | |
| 6,688,621 B2 | | 2/2004 | Benirschke | |
| 6,742,793 B2 | | 6/2004 | Henriksen et al. | |
| 6,997,469 B2 | | 2/2006 | Lanoue et al. | |
| 7,000,932 B2 | | 2/2006 | Heil et al. | |
| 7,044,487 B2 | * | 5/2006 | Byrne | 280/163 |
| 2003/0006576 A1 | | 1/2003 | Lanoue et al. | |
| 2004/0173987 A1 | | 9/2004 | Chapman | |
| 2005/0067741 A1 | | 3/2005 | Chapman | |

(Continued)

*Primary Examiner* — Hau V Phan
*Assistant Examiner* — Bridget Avery
(74) *Attorney, Agent, or Firm* — Bereskin & Parr LLP/S.E.N.C.R.L.,s.r.l

(57) ABSTRACT

A running board assembly for mounting to a vehicle such as a truck includes an extruded running board body and a cover member. Advantageously the extruded running board body is made from an extrudable plastic and the cover member is advantageously made of a material having the desired exterior finish. The cover member may be metallic and have the appearance of a chrome or polished finish. The cover extends over the upper and outboard surface of the running board body to provide the desired appearance characteristics. The running board assembly is affixed to the vehicle by a plurality of mounting brackets.

10 Claims, 9 Drawing Sheets

U.S. PATENT DOCUMENTS

| | | |
|---|---|---|
| 2005/0093266 A1 | 5/2005 | Smith et al. |
| 2005/0179226 A1 | 8/2005 | Kolpasky et al. |
| 2005/0263973 A1 | 12/2005 | Koumura |
| 2005/0263974 A1 | 12/2005 | Mulder |
| 2005/0263975 A1 | 12/2005 | Mulder et al. |
| 2007/0126201 A1 * | 6/2007 | Crandall ........................ 280/163 |

* cited by examiner

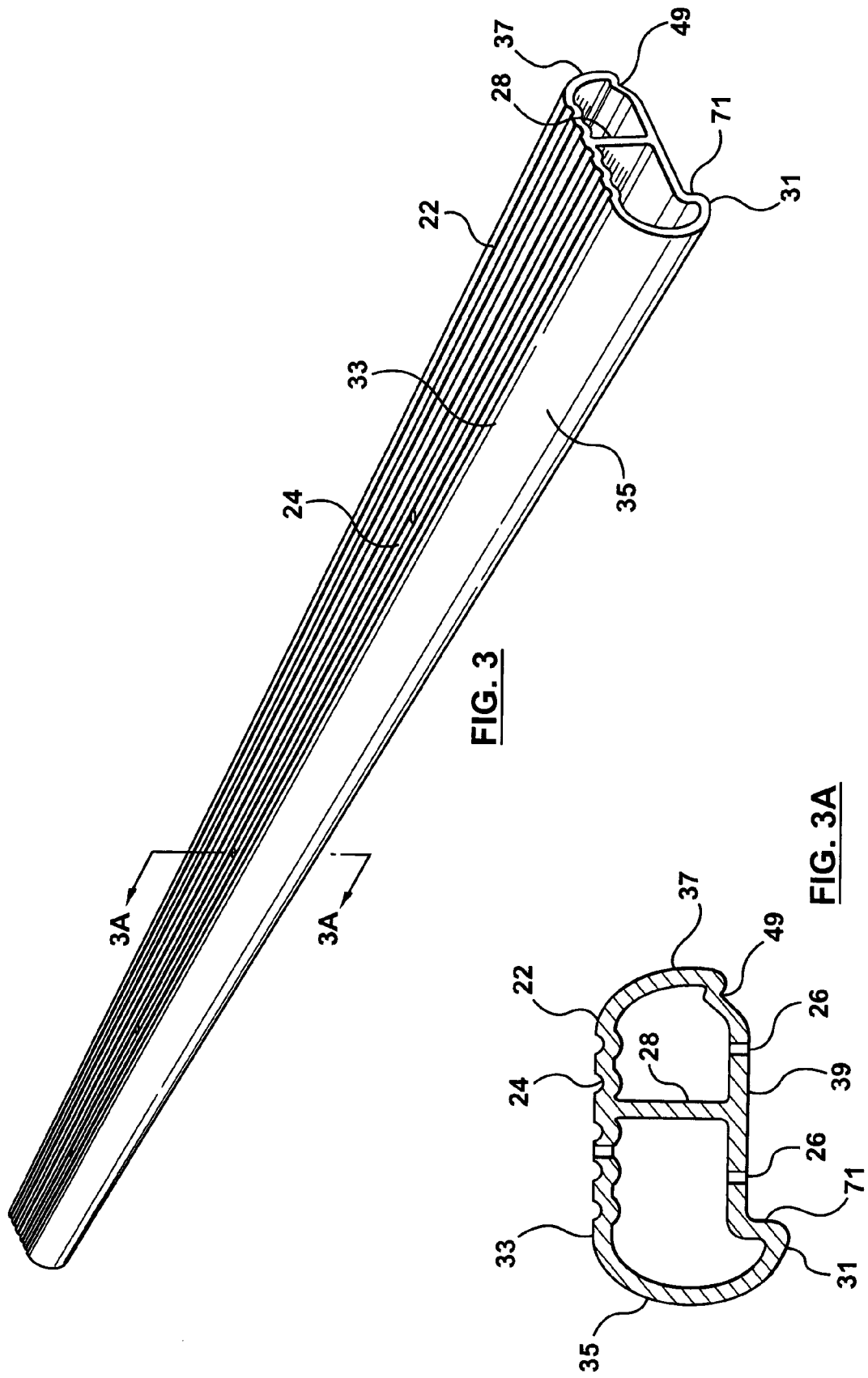

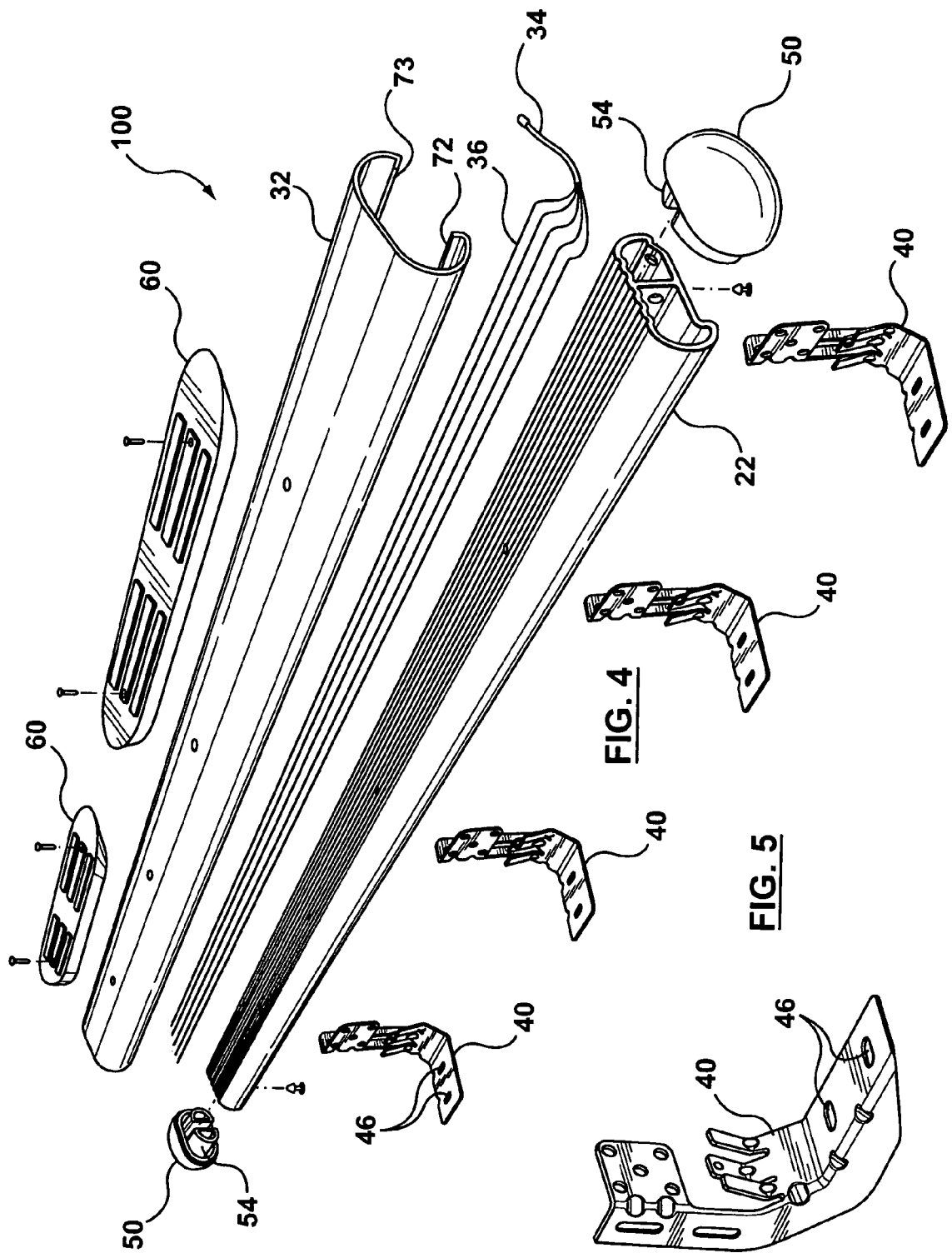

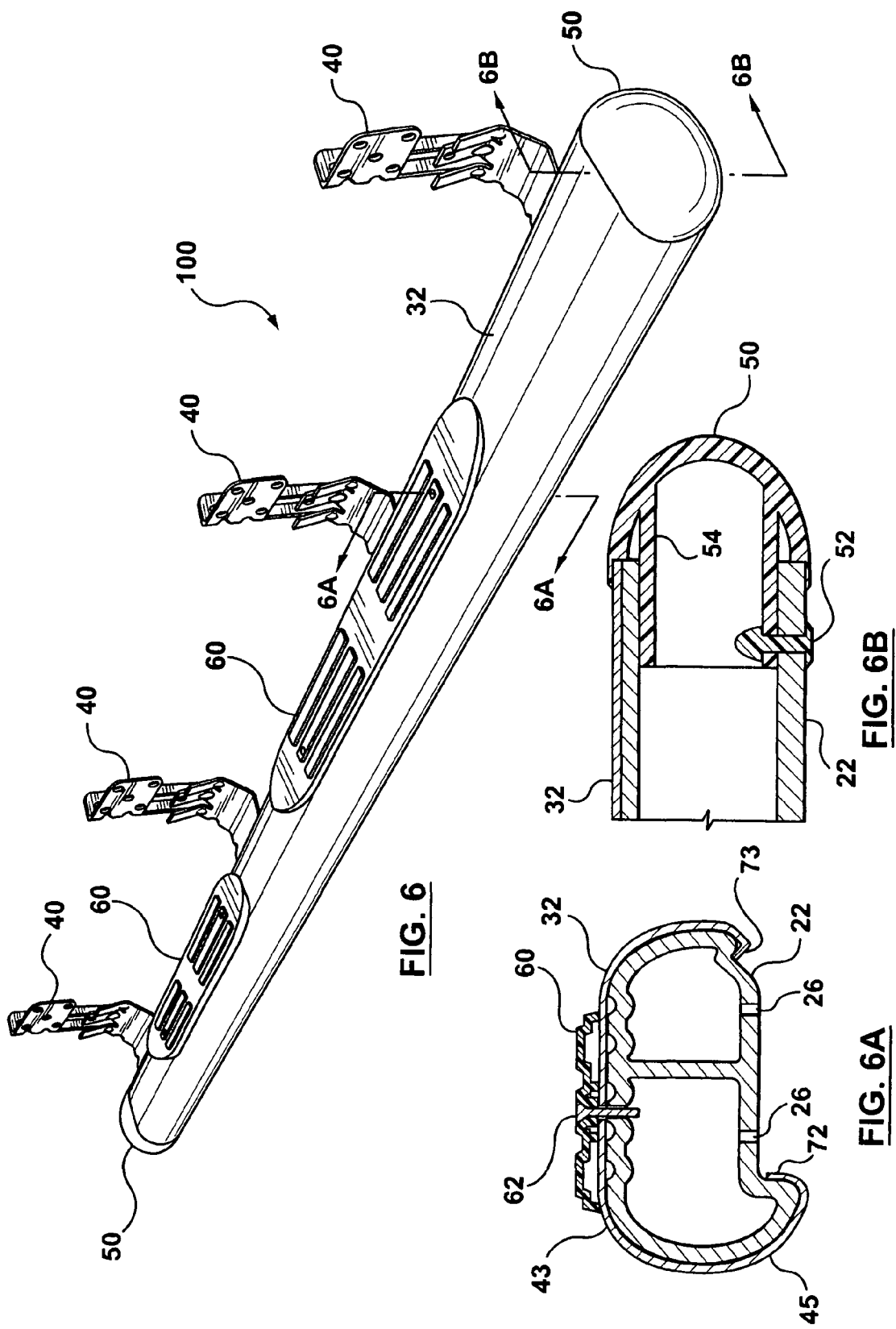

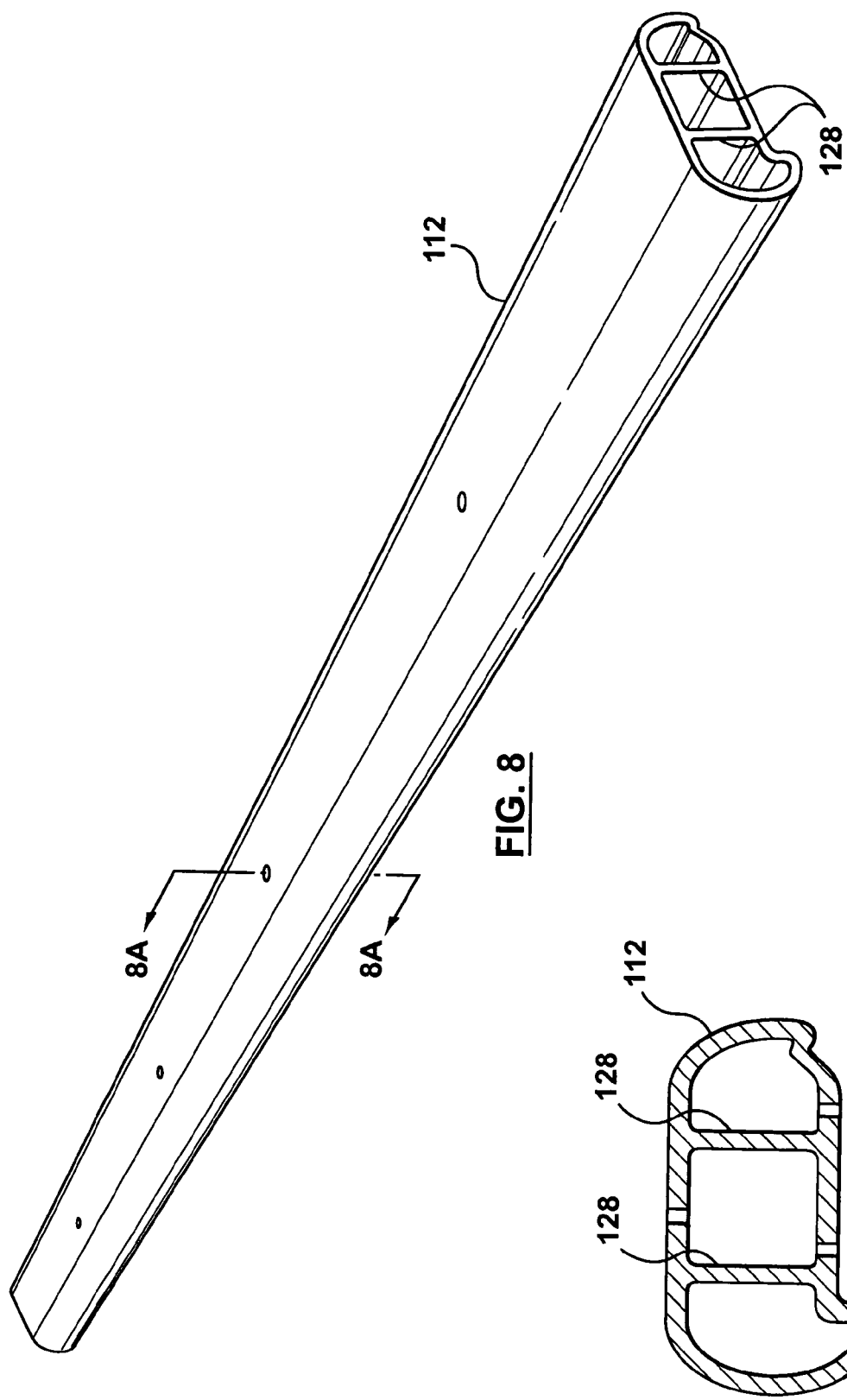

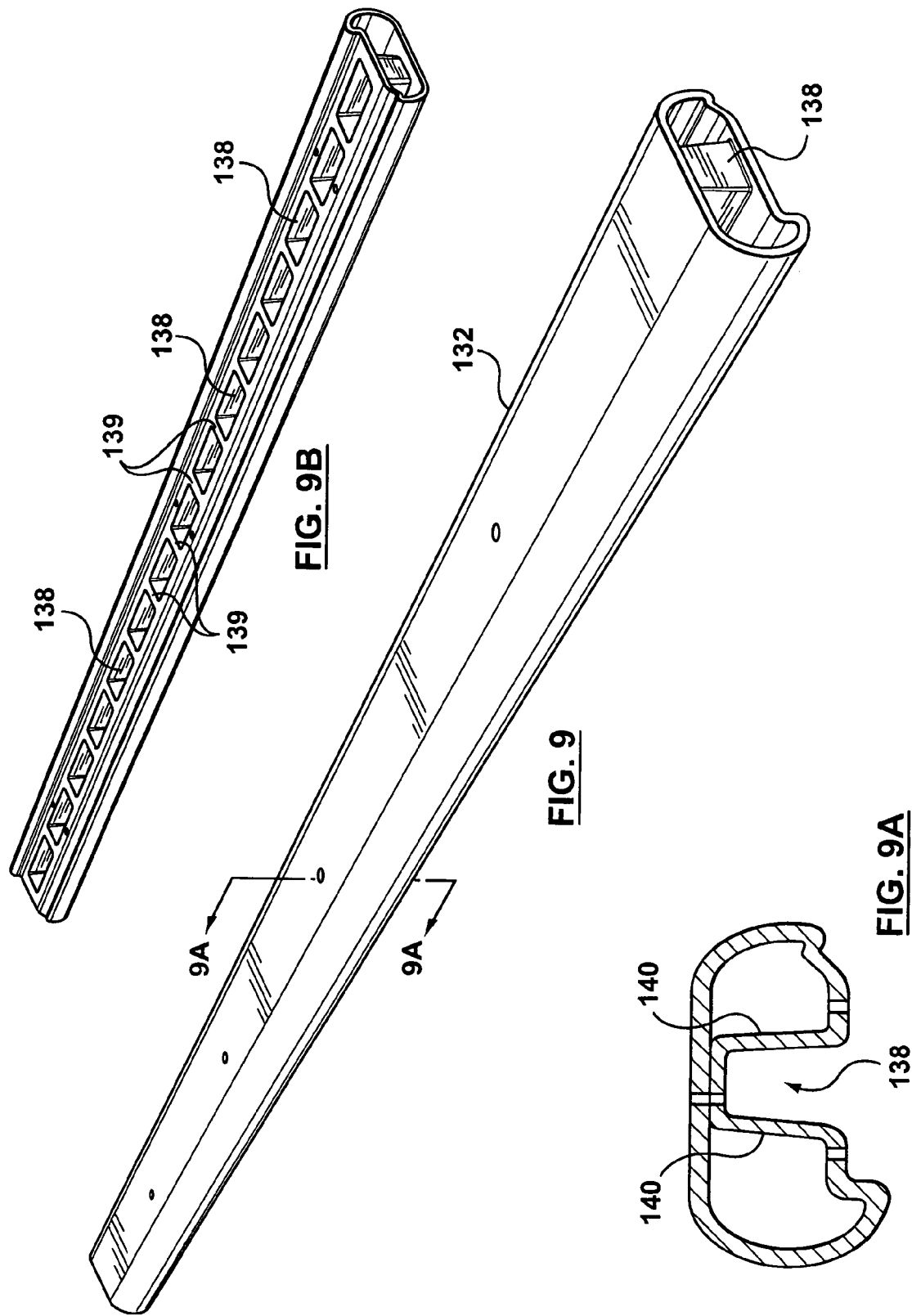

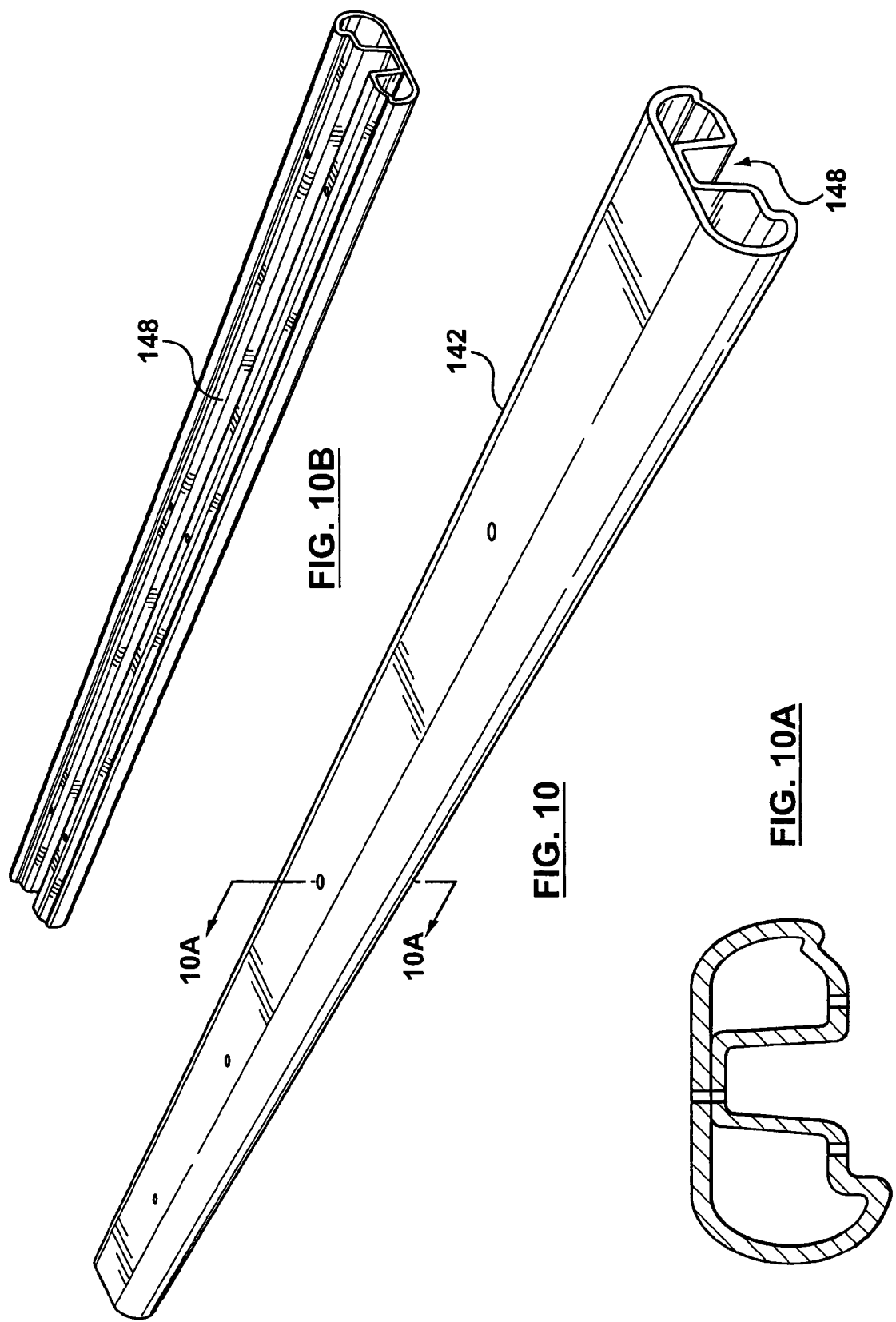

RUNNING BOARD FOR VEHICLE

FIELD OF THE INVENTION

The present invention relates to running boards, sometimes referred to as assist steps for use on vehicles and to a method for making such running boards.

BACKGROUND OF THE INVENTION

Running boards or assist steps, are often mounted on vehicles for assisting the user to climb into and out of the vehicle. Such running boards also have decorative function and are often added as an accessory either as part of an original instillation or as part of an after market instillation to add to the vehicle aesthetics.

One such running board is illustrated in U.S. Pat. No. 6,588,782, which issued Jul. 8, 2003 to Coomber. The running board of Coomber involves a plurality of components. According to one embodiment of Coomber, the running board is constructed of aluminum. While Coomber does suggest that other materials may be utilized for such a running board, Coomber does not otherwise explicitly deal with structures other than aluminum.

SUMMARY OF THE INVENTION

In accordance with one embodiment of the invention, a running board assembly for mounting to a vehicle includes a running board body and a cover member.

In accordance with another aspect of the invention, a running board assembly for mounting to a vehicle includes a running board body having an upper surface and an outboard surface. The assembly also includes a cover member which includes an upper surface and an outboard surface. The outboard surface of the cover member extends over substantially all of the outboard surface of the running board body upon assembly.

In accordance with another aspect of the invention, the invention involves a method of making a running board assembly for mounting on a vehicle. The method involves the step of continuously extruding a thermoplastic running board body and cutting the running board body extrusion to a desired length. A cover member is provided, the cover member having a outboard surface which when assembled will extend over substantially all of the outboard surface of the running board body. The cover member is assembled to the running board body so that visually, the appearance of the assembly from an outboard direction is constituted primarily by the outboard surface of the cover member.

Further and other aspects of the invention may be appreciated from a review of the following description of embodiments in accordance with the invention.

BRIEF DESCRIPTION OF THE DRAWINGS

The invention will be better understood from reference to the following drawings which illustrate embodiments of a running board in accordance with the invention, in which:

FIG. 3 illustrates an alternate component similar to the component illustrated in FIG. 2;

FIG. 3A illustrates a cross-section of the component of FIG. 3 along lines 3A-3A;

FIG. 4 illustrates an exploded assembly view of a running board in accordance with the invention utilizing the component of FIG. 3;

FIG. 5 illustrates in perspective view, one of the components illustrated in the assembly of FIG. 4;

FIG. 6 illustrates the assembly of FIG. 4;

FIG. 6A illustrates a cross-section along the line 6A-6A of FIG. 6;

FIG. 6B illustrates a cross-section of FIG. 6 along line 6B-6B of FIG. 6;

FIG. 8 is a view similar to FIG. 2 illustrating an alternate component to that illustrated in FIG. 2;

FIG. 8A illustrates a cross-section along line 8A-8A of FIG. 8;

FIG. 9 illustrates a further alternate component similar to FIG. 2;

FIG. 9A illustrates a cross-section along the line 9A-9A of FIG. 9;

FIG. 9B is a bottom view of the component illustrated in FIG. 9;

FIG. 10 illustrates a further alternate component similar to the component illustrated in FIG. 2;

FIG. 10A is a cross-section along line 10A-10A of FIG. 10, and

FIG. 10B is a bottom view of the component shown in FIG. 10.

DETAILED DESCRIPTION OF THE INVENTION

Figure 1:
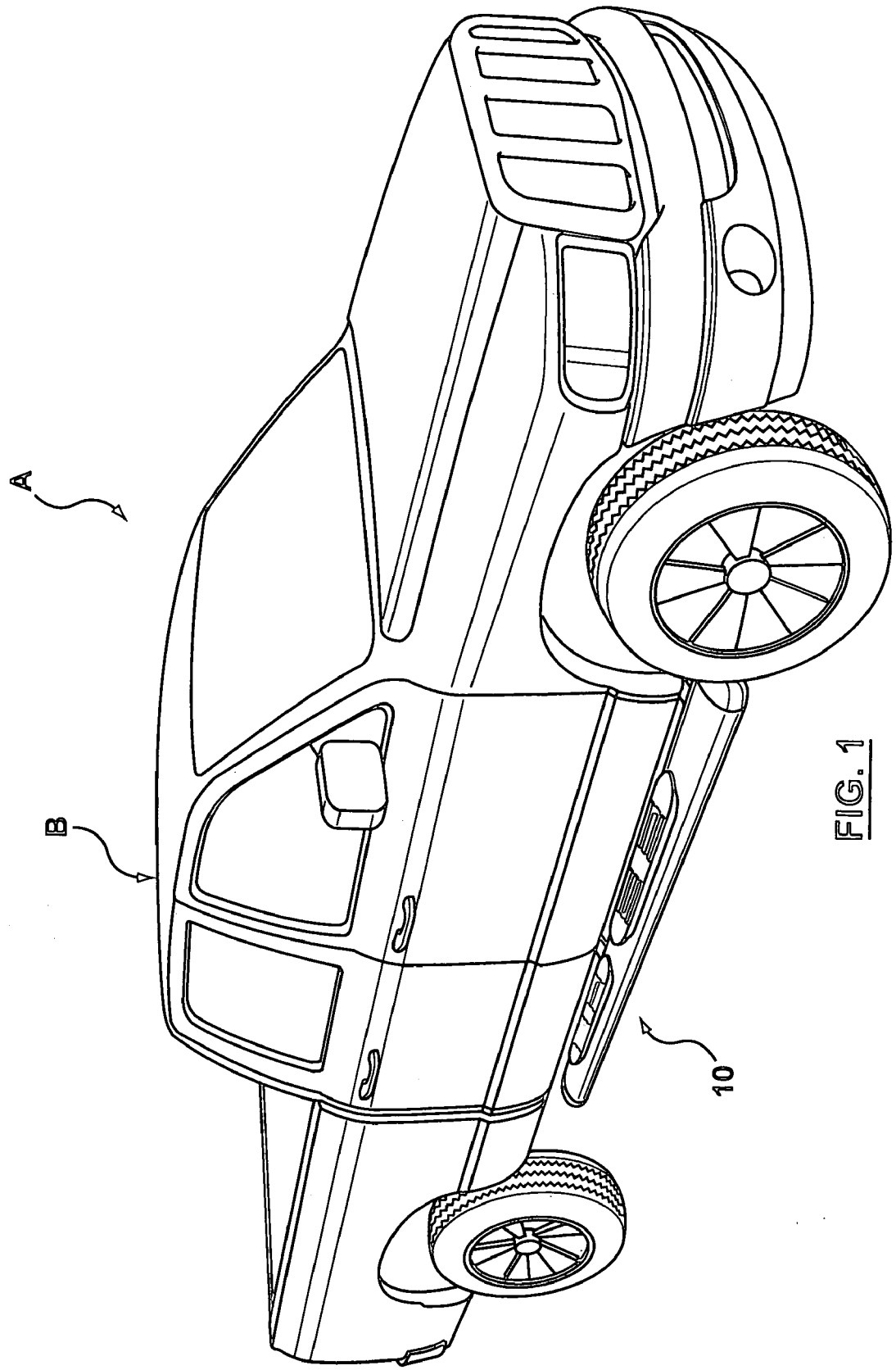
FIG. 1 illustrates an assembled running board in accordance with one embodiment of the invention installed on a vehicle.

FIG. 1 illustrates an assembly A including a vehicle B and a running board assembly 10 mounted on vehicle B. The running board assembly 10 gives a significant aesthetic appearance in connection with the vehicle B and also serves a utilitarian function to assist passengers stepping into and out of the vehicle B. The running board assembly may be installed on either the passenger side, the driver side or both sides of the vehicle.

Figures 2, 2A:
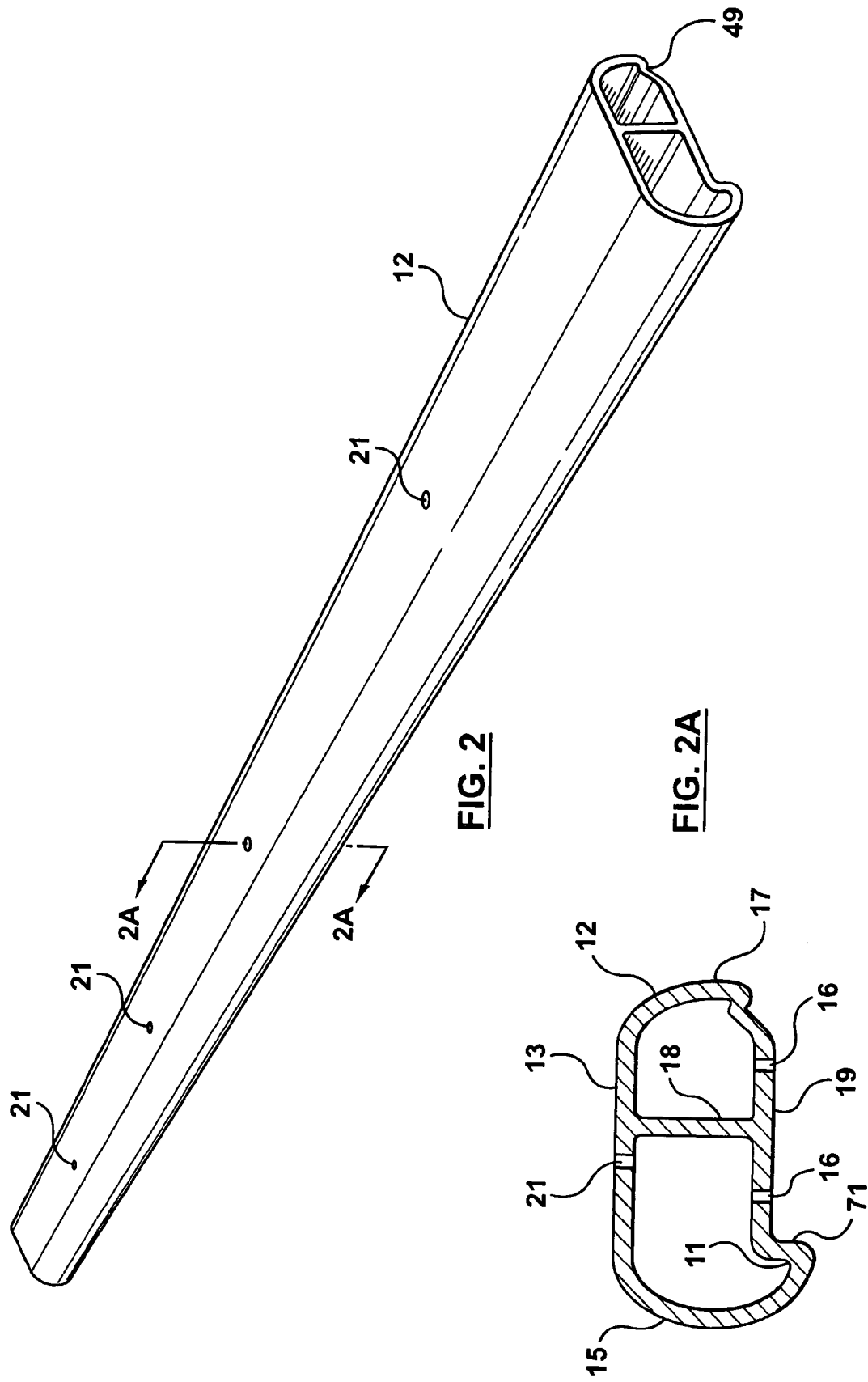
FIG. 2 illustrates one component of the assembly illustrated in FIG. 1.
FIG. 2A illustrates a cross section along the line 2A-2A of FIG. 2.
Figure 7:
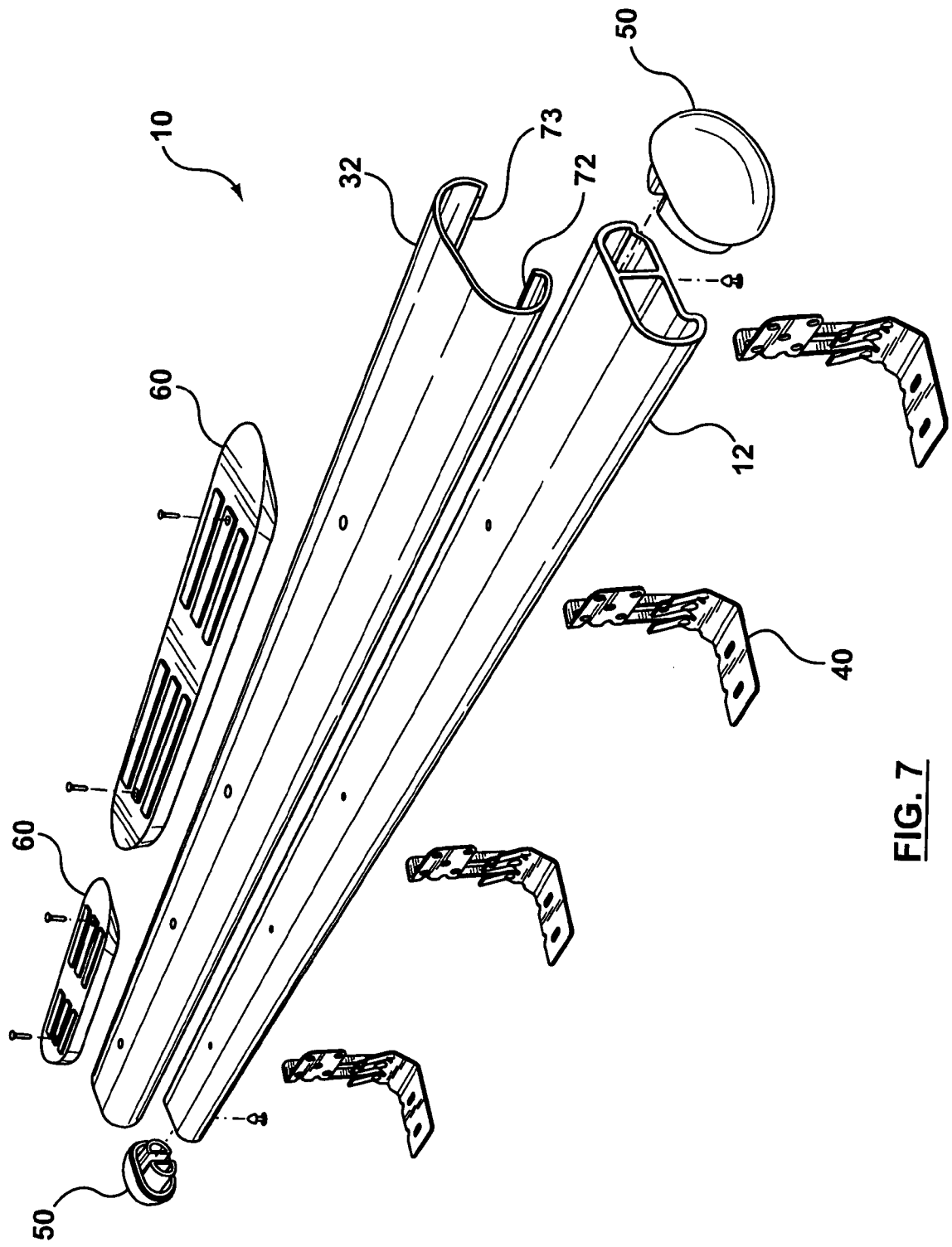
FIG. 7 illustrates an exploded view similar to FIG. 4 but using alternate components.

FIG. 2 illustrates one of the components of the assembly 10 of the running board illustrated in FIG. 1. FIG. 2 illustrates a running board body 12. The running board body 12 advantageously has a uniform cross-section as shown in FIG. 2A. The running board body 12 includes what will be when installed on the vehicle, an upper surface 13, an outboard surface 15, an inboard surface 17 and a lowermost surface 19. In addition, the running board body 12 includes at least one longitudinally extending rib 18.

Advantageously, the running board body 12 is manufactured in a continuous extrusion process using a thermoplastic suitable for extrusion. The thermoplastic may be extruded continuously through a suitably shaped die. One of the advantages of this method is that the extrusion may be cut to desired lengths to facilitate the vehicle on which the running board body is to be assembled and mounted. To provide additional strength, advantageously, the running board body 12, includes at least one generally vertically extending interior rib 18 as illustrated in FIG. 2A. After extrusion, the running board body 12 may be drilled to provide mounting holes 16 as shown in FIG. 2A for mounting purposes to be discussed below. Additionally, the extrusion body 12 may be drilled to provide mounting holes in the upper surface 13 as shown at 21 in FIG. 2.

FIG. 3 illustrates an alternate running board body 22 which is similar to running board body 12 but involves alternate features. In this case, the running board body 22 includes an upper surface 33, an outboard surface 35, and inboard surface 37 and a lower surface 39. The extrusion body 22 includes a longitudinally extending generally vertical rib 28 which is included for strengthening purposes. In the embodiment illustrated in FIGS. 3, 3A and FIG. 4, the running board body 22 is provided with a plurality of longitudinally extending grooves 24 which extend longitudinally along the running board body 22 in the upper surface 33.

From reference to FIG. 4 there is illustrated therein an assembly 100 in exploded view. The running board assembly 100 includes the running board body 22, a cover member 32, a plurality of mounting brackets 40, a plurality of end caps 50, and a plurality of step plates 60. Additionally, the assembly 100 includes a wiring harness 34, the wiring harness 34 includes a plurality of longitudinally extending heating elements 36.

Upon assembly, of the components of the assembly 100 as illustrated in FIG. 4, the heating elements 36 are positioned in respective ones of the longitudinally extending grooves 24. The heating elements 36 may be operated by an energizing circuit, not illustrated. The purpose of the heating elements 34 is to provide heat for the running board assembly 100 so as to minimize the formation of ice on the cover member 32.

The cover member 32 is advantageously made of metal. Particularly advantageously, the cover member 32 includes a chrome-like or polished finish. While the running board body 12 or 22 may be provided with a reasonably smooth finish depending upon the extrusion techniques, the resin chosen and the die suitability, generally speaking, it will not be possible to extrude a running board body which has the appearance of a chromium tube or a polished appearance. Suitable appearance is provided by the cover member 32 which enables the manufacture of a running board assembly which appears to have a chromium finish or a polished tubular member, but is in fact an extruded thermoplastic member with a cover member.

One of the advantages of the present invention is that running boards which were formerly required to be made in aluminum or steel may be made using a thermoplastic extruded running board body 12 or 22 and yet the appearance as desired may be achieved by means of the cover member 32.

FIG. 5 illustrates a mounting bracket 40 which may be used to mount the running board body/cover member assembly to a vehicle with or without one or more step pads 60 and with or without a wiring harness 34.

FIG. 6 illustrates the assembly of the components shown in exploded view of FIG. 4. In the assembly shown in FIG. 6, the running board assembly 100 includes a running board body 22, a cover member 32 and two end caps 50, four mounting brackets 40 and two step pads 60. The step pads may be made from thermoplastic material or metal. Advantageously to obtain contrast, the step pads may have a different colour or polish finish to more clearly indicate the area for stepping. The end caps 50 may be manufactured in a plastic injection molding process. The end caps 50 are provided with a central member 54 for being received within the interior of the running board body 12 as shown in FIG. 6B. To retain the end caps, a fastener 52 may be extended through an aperture drilled in the running board body 12 or 22 respectively.

Reference is now made to FIG. 6A. It will be observed that the cover member 32 includes an upper surface 43, an outboard surface 45 and an inboard surface 47. The upper surface 43 and the outboard surface 45 extend over the upper surface 13, 33 of the running board body 12 or 22 respectively, and virtually completely over the outboard surface 15, 35 of the running board body 12 or 22 respectively.

Preferably, in order to provide the appearance of a metallic tubular or chrome finished member, the running board body 12, 22 includes a relatively downwardly extending extension portion 11, 31. The downwardly extending portion 11, 31 defines an inner retention surface 71. The inner retention surface 71 is directed in a direction so that it is not visible from the outboard direction of the running board assembly when installed. As shown in FIG. 6A, the retention surface 71 is generally vertical and faces inward.

The cover member 32, when installed on the running board body 12 or 22 respectively, presents the outboard surface 45 visually when installed on the vehicle B. Preferably, the cover member 32 extends downwardly and around the extrusion body 12 or 22 respectively, and extends adjacent the mounting surface 71. This first return lip is shown at 72 in FIG. 6A.

Advantageously, the inboard facing surface 47 of the cover portion 32 extends over at least a portion of the inboard facing surface 17, 37 of the running board body 12, 22. Advantageously, the cover member 32 includes a second return lip 73 which is received in a mounting groove 49 of the running board body 12 or 22 respectively as shown in FIG. 6A.

The cover member 32 may be installed on the running board body 12, 22 in a number of different manners. The cover member 32 may be aligned with the selected length of running board body 12, 22 and slid longitudinally along until the cover member is aligned longitudinally with the ends of the running board body 12, 22. Alternatively, depending upon the flexibility of the cover member 32, the cover member 32 may be installed by placing the return lip 71 against the surface 11 and then snapping the cover member 32 around the inboard surface 17, 37 so that the second lip 73 is received in the groove 49.

The step plate 60 can be installed on the assembly of the cover member 32 and running board body 12, 22 by passing fasteners 62 through the step plate 60, through the cover member 32 and into threaded apertures 21 in the running board body 12, 22.

To comprise the assembly 100 shown in FIG. 6, a plurality of mounting brackets 40 may be affixed to the extrusion body by placing fasteners into predrilled holes 16, 26 in the running board body 12, 22.

Once the assembly has been completed as shown in cross-section in FIG. 6, there is presented a running board which has particularly pleasing aesthetics. The aesthetics are provided by the cover member 32. Accordingly, when extruding the running board body 12 or 22 respectively, the extrusion may be done without the necessity of any additional expense to provide particularly superior surface finish as might otherwise be required if the exterior surfaces of the running board body were to be visible when installed on the vehicle.

Another significant advantage of the assembly as shown in FIG. 6 is that the cover member 32 may be made from metal. The metal not only provides the desirable aesthetics but also serves several utilitarian functions. Firstly, a metallic cover member 32 provides a durable finish as far as wear or abrasion resistance is concerned, either from persons stepping on the metal surface or from road debris and the like which may contact the running board once installed on the vehicle. Secondly, by providing a metallic cover member 32, heat generated by the wiring harness 34 may be efficiently distributed over the surface of the running board assembly assisting in removal of any ice or snow build up on the surface of the running board assembly.

Additionally, it should be observed that the cover member 32 advantageously, closely fits with the profile of the running board body 12, 22. When affixed to the running board body 12, 22, as illustrated, the cover member 32 additionally serves to provide significant additional bending strength to the running board assembly. By having the inboard facing surface 47 and outboard facing surface 45, as well as having the return lips 72 and 73, the metallic cover member 32 provides significant strength in bending itself and together with running board body 12, 22 constitutes a multi-material beam for the assembly 10, 100. This is of particular significance as the running board body 12, 22 made from a thermoplastic material, may in fact have less strength when subjected to extreme heat conditions. Thus, a vehicle parked in the sun with a running board assembly mounted on the vehicle may be subject to direct sunlight over extended periods of time. With increased heat, thermoplastic extrusions may have deteriorated strength. However, by reason of the installation of the cover member 32 as described herein, the running board assembly 10, 100 maintains significantly increased bending strength as opposed to the running board body alone.

With respect to the discussions above explaining the running board body 12 and 22, shown therein is an extrudable component in which there is a single longitudinally extending rib. The rib serves to strengthen the running board body. FIG. 8 illustrates an alternate running board body 112. FIG. 9 illustrates a further alternative running board body 132, while FIG. 10 illustrates a further alternate running board body 142.

With respect to FIG. 8, it will be recognized that by comparison to the running board body 12 illustrated in FIG. 2, the running board body 112 comprises a pair of longitudinally extending ribs 128. As shown in the cross-sectional view of FIG. 8A, the running board body 112 can be extruded through a suitable die. In other respects, the running board body 112 is similar to the running board body 12 discussed above, and has similar features more fully described above.

Turning now to FIG. 9, there is illustrated a running board body 132. Running board body 132 is similar to running board body 12 except that as extruded, there is no central strengthening rib 128. Rather, the running board body 132 may be extruded as a substantially hollow member with no internal ribs in place following extrusion. While such a profile may have appropriate strength without any further steps, it is more likely to be desirable to strengthen such an extrusion. The extrusion shown in FIG. 9, 132, can be given additional strength by a secondary operation. In the secondary operation, at least the lowermost surface of the extruded running board body is heated and a die, which may itself be heated, is pressed into the lowermost surface. As the die is pressed into the lowermost surface, the thermoplastic comprising the lowermost surface of the extruded running board body is softened and moved to form a plurality of strengthening recesses 138. Each strengthening recess 138 includes a pair of transversely extending walls 139, and a pair of longitudinally extending walls 140. A portion of the strengthening recess 138 comprised of the lowermost surface of the running board body 132 is advantageously pressed into contact with the innermost surface of the upper surface of the running board body 132. Even more advantageously, this portion of the thermoplastic is heated so that there is a fusion as shown in FIG. 9A. The size of the strengthening recesses 138 may be selected by the designer. Similarly, the running board body 132 may include only a few such strengthening recesses or a plurality spaced as far apart, or as close together as desired, to obtain the required strengthening characteristics.

FIG. 10 illustrates a running board body 142 which is similar in concept to the running board body 132 shown in FIG. 9. The similarity is that the running board body 142 has a uniform cross-section upon extrusion which would be similar to the cross-section of running board 132 upon extrusion. As with running board body 132, running board body 142 is subjected to a secondary manufacturing operation. In this case, a single longitudinally extending strengthening channel 148 is molded into the lowermost surface of the running board body 142. This may be accomplished by heating the lower surface of the running board body 142, and pressing into the lowermost surface a forming tool to mold the plastic to form the longitudinal strengthening channel 148. The length of the channel 148 may coincide with the desired length of the extruded running board body 142, as illustrated in FIG. 10B, or alternatively, the channel 148 may have a length something less than the entire length of the running board body 142. Further, alternatively, as the running board body 142 has a uniform cross-section throughout its length, the running board body 142 could be extruded in that particular cross-sectional configuration as shown at FIG. 10A.

In connection with the embodiment illustrated in FIG. 3, it is pointed out that the running board can include a heating concept. Although generally metals have the highest heat conductivity, and therefore a metal cover member has superior heat conduction characteristics, it is possible that the cover member may be made from materials other than metals. Generally speaking, thermoplastics, which are unmodified for enhanced thermal conductivity, have thermal conductivity ratings about 0.2 W/m.C (Watts/meter-degrees Celsius). In some cases it may be desirable to produce a cover member from a thermoplastic material and at the same time use a thermoplastic with enhanced thermal conductivity. For usual thermoplastics involved in this type of extrusion, ceramic or metallic fillers may be added to increase the thermal conductivity up to 2 W/m.C. Carbon fiber may also be used to increase the conductivity up to values approaching 10 W/m.C. There are certain other proprietary formations which can be used to increase the conductivity of extrudable polymers up to the range of 10-100 W/m.C. While these will not provide quite as much thermal conductivity, which in the case of die cast metals are in the range of 50-100 W/m.C, or that of extrusion grade aluminum, which is near 150 W/m.C., these enhanced thermoplastics may also be used in conjunction with this invention.

While any thermoplastic which is extrudable may be used for the running board body, the selected thermoplastic must have the characteristics to be acceptable in the range of heat and cold that might be expected of a vehicle which is left outside on a winter night, or subject to direct sun, heat loading in the summer. The particularly preferred material of choice for the running board body is a 15% glass filled polypropylene. This material is readily available.

Illustrative embodiments of the invention have been described herein. It will be apparent to those skilled in the art that various other modifications and amendments may be made. All such modifications and amendments are considered to be within the scope of this invention, which is defined in the following claims.

The invention claimed is:

1. A running board assembly for mounting to a vehicle, said assembly comprising an extruded running board body, and a cover member;
   said running board body having an upper surface, an outboard surface and an inboard surface,
   and wherein said cover member comprises an upper surface, an outboard surface and an inboard surface, wherein said outboard surface of said cover member extends over substantially all of said outboard surface of said running board body and said upper surface of said cover member extends over substantially all of said upper surface of running board body;

and wherein said cover member comprises a first return lip;

and wherein said outboard surface of said running board body comprises at least one retention surface and said retention surface receives said first return lip;

and wherein said inboard surface of said running board body comprises at least one mounting groove and wherein said inboard surface of said cover member comprises a second return lip and said second return lip is received in said mounting groove.

2. The assembly of claim 1 wherein said running board body is thermoplastic and said cover member is metallic.

3. The assembly of claim 1 wherein said running board body is generally hollow and comprises at least one longitudinally extending internal rib.

4. The assembly of claim 1 wherein said running board body comprises at least one longitudinally extending groove in said upper surface; said assembly further comprising at least one heating element contained within said at least one longitudinally extending groove.

5. The assembly of claim 1 wherein said running board body, has a final configuration;

said final configuration comprising firstly, a configuration which may be extruded so as to provide a uniform, transverse, cross-section throughout its longitudinal length and which final configuration has a shape comprising manipulation of at least one wall of said cross-section following extrusion.

6. The assembly of claim 1 further comprising at least one step pad.

7. The assembly of claim 1 further comprising a plurality of end caps.

8. The assembly of claim 1 further comprising a plurality of mounting brackets.

9. The assembly of claim 3 wherein said running board body has a uniform transverse cross section throughout its longitudinal length.

10. The assembly of claim 4 wherein said cover member is a metallic cover member.

* * * * *